(12) United States Patent
Faram et al.

(10) Patent No.: US 7,344,636 B2
(45) Date of Patent: Mar. 18, 2008

(54) SEPARATOR

(75) Inventors: Michael Guy Faram, Portishead (GB); Mark Richard Bowditch, Bridgewater (GB); Paul Lecornu, Shepton Mallet (GB); Pam J. Deahl, Scarborough, ME (US); Jeremy Fink, Portland, ME (US); Mark P. Wogaman, Gorham, ME (US); Robert Yaw Gwamfi Andoh, South Portland, ME (US)

(73) Assignee: Hydro International PLC, Clevedon (GB)

( * ) Notice: Subject to any disclaimer, the term of this patent is extended or adjusted under 35 U.S.C. 154(b) by 442 days.

(21) Appl. No.: 10/926,339

(22) Filed: Aug. 26, 2004

(65) Prior Publication Data

US 2006/0043010 A1   Mar. 2, 2006

(51) Int. Cl.
*B01D 21/26* (2006.01)
*B01D 33/70* (2006.01)
*B04C 5/12* (2006.01)
*B04C 5/14* (2006.01)

(52) U.S. Cl. .................. 210/130; 210/97; 210/294; 210/304; 210/512.1

(58) Field of Classification Search ............... 210/788, 210/801, 97, 130, 294, 304, 512.1
See application file for complete search history.

(56) References Cited

U.S. PATENT DOCUMENTS

| 5,788,848 | A | 8/1998 | Blanche et al. |
| 6,730,222 | B1 | 5/2004 | Andoh et al. |
| 6,780,310 | B1* | 8/2004 | Howe ..................... 210/304 |

FOREIGN PATENT DOCUMENTS

| DE | 197 53 966 | 5/1999 |
| GB | 1 232 373 | 5/1971 |
| GB | 2 293 993 | 4/1996 |
| JP | 59-177105 | 10/1984 |

\* cited by examiner

*Primary Examiner*—David A Reifsnyder
(74) *Attorney, Agent, or Firm*—Stites & Harbison, PLLC; Marvin Petry

(57) ABSTRACT

A separator comprises a gully chamber 2 having inlet and outlet ducts 10, 12. Inlet and outlet housings 20, 22 are disposed within the separator and are connected by a bypass duct 24 which extends around the wall of the chamber 2. Flow enters the chamber through an inlet which is oriented to create a circulating flow. Flow exits from the chamber through an outlet opening provided in the outlet housing 22. The outlet opening is oriented in the direction of the circulating flow so that liquid has to reverse from that flow to pass through the outlet opening. The inlet and outlet housings 20, 22 are made from identical mouldings in which appropriate openings are formed. The bypass duct can be cut to length to position the inlet and outlet housings 20, 22 opposite existing inlet and outlet ducts 10, 12.

24 Claims, 5 Drawing Sheets

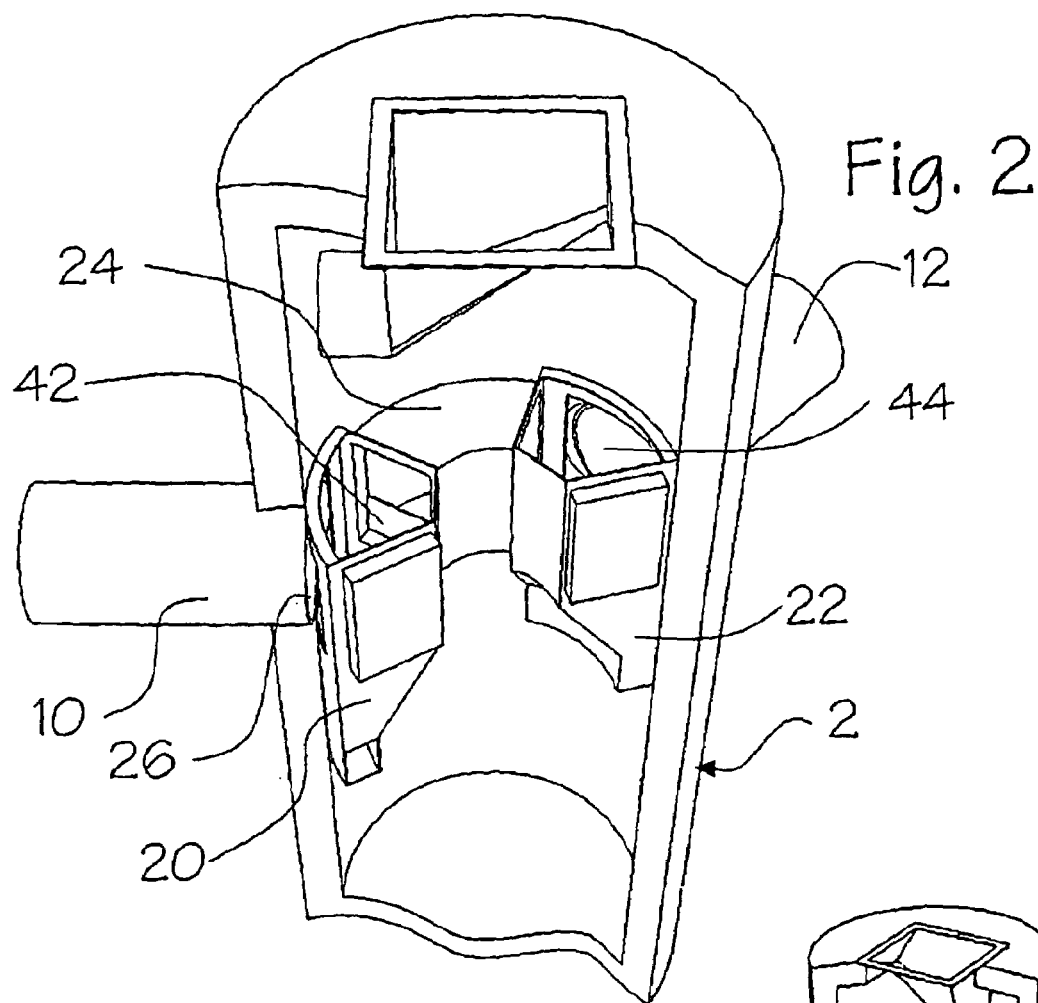
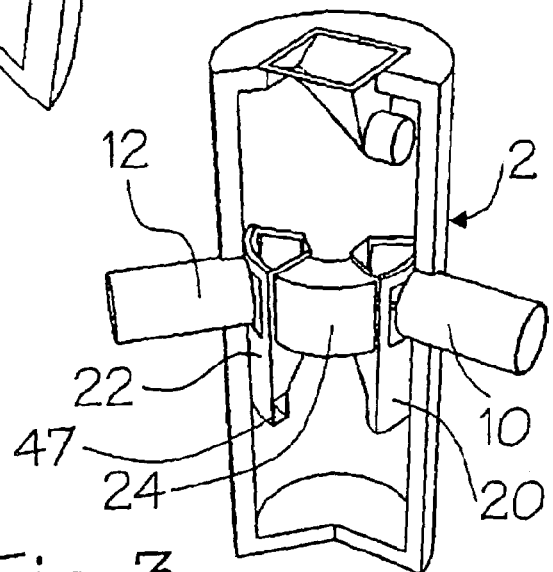

SEPARATOR

This invention relates to a separator for separating solids from a liquid flow. The invention is particularly, although not exclusively, concerned with a separator for use in drainage system for the primary separation of solids such as sand, street litter, gross solids and the like from storm water.

Conventional gullies under roadways and other paved areas comprise a chamber having inlet and outlet pipes which open into the chamber at a position above the bottom of the chamber. There may also be a top inlet, which provides access to the interior of the chamber through a grating provided at the roadway surface, for example in a gutter. In use, solids entering the chamber, whether from the inlet pipe or through the grating, collect under gravity in the base of the chamber and can be extracted at intervals by means of a suction pipe introduced into the chamber after removing the grating. Such gullies have a low separation efficiency. Furthermore, in the event of heavy storm flows, collected solids in the base of the chamber, and solids floating on the surface tend to be stirred up, and can pass into the outlet pipe.

According to the present invention, there is provided a separator for separating solids from a liquid flow, comprising a chamber having an inlet opening directed so that inflowing liquid creates a circulating flow within the chamber about a central axis of the chamber, the chamber also having an outlet opening directed so that outflowing liquid passes through the outlet opening in a direction opposite that of the circulating flow.

The inlet opening may be directed so that incoming flow enters the chamber in a tangential direction with respect to the central axis of the chamber. The outlet opening may also be directed tangentially, and in the same direction as the inlet opening so that it effectively faces in the direction of the circulating flow. The relative orientations of the inlet and outlet openings means that, even under conditions of heavy flow, solids will be swept past the outlet opening rather than leave the chamber. Consequently, both newly introduced solids, and any which have previously settled to the base or floated to the surface, are more likely to be retained within the chamber.

The inlet opening may be provided in a wall of an inlet housing, defining an inlet compartment within the chamber. An inlet duct extending through the chamber wall thus preferably emerges into the inlet housing. Thus, incoming flow from the inlet duct first enters the inlet compartment and then emerges into the main interior of the chamber through the inlet opening.

A similar structure may be used for the outlet opening, which may comprise an outlet housing providing an outlet compartment disposed within the chamber. The inlet and outlet housings may be open at their upper ends.

A bypass duct preferably extends between the housings.

According to another aspect of the present invention, there is provided a separator for separating solids from a liquid flow, comprising a chamber having an inlet provided in a wall of an inlet housing which defines an inlet compartment within the chamber, the inlet opening being directed so that inflowing liquid creates a circulating flow within the chamber about a central axis of the chamber, the chamber also having an outlet opening provided in a wall of an outlet housing which defines an outlet compartment within the chamber, in which a bypass duct extends around the central axis of the chamber between the housings The bypass duct may extend adjacent the chamber wall, to leave access through the centre of the chamber for a suction pipe or other device to extend from the top of the chamber to the base or to the fluid surface to extract accumulated solids or floating debris and oils. In a preferred embodiment, the bypass duct is arcuate and has a rectangular, for example square, cross-section.

The bypass duct preferably communicates with the inlet compartment through an opening in a wall of the inlet compartment. A weir may be provided between the inlet compartment and the bypass duct, the upper edge of the weir being situated above the lower edge of the inlet passage at its entry to the inlet compartment. Thus, in periods of heavy flow, only some of the flow entering the inlet compartment will pass through the inlet opening, and the remainder will pass over the weir and through the bypass duct directly to the outlet compartment.

The inlet and outlet housings may comprise housing mouldings in which openings are formed after moulding. Thus, according to another aspect of the present invention, there is provided a separator for separating solids from a liquid flow, comprising a chamber having an inlet provided in a wall of an inlet housing which defines an inlet compartment within the chamber, the inlet opening being directed so that inflowing liquid creates a circulating flow within the chamber about a central axis of the chamber, the chamber also having an outlet opening provided in a wall of an outlet housing which defines an outlet compartment within the chamber, in which a bypass duct extends around the central axis of the chamber between the housings, in which the inlet and outlet housings comprise housing mouldings in which the openings are formed after moulding.

The openings may, for example, be formed to provide communication between the inlet and outlet compartments with the inlet and outlet ducts respectively, and with the opposite ends of the bypass duct. In a preferred embodiment, the housing mouldings for the inlet and outlet housings are identical before the openings are made, so providing economy in manufacture.

The mouldings have projections for fitting within the bypass duct so as to locate the components relatively to each other.

According to another aspect of the present invention there is provided a method of modifying a gully chamber to provide a separator, the method comprising:

(a) assembling a bypass module from an inlet housing, an outlet housing and a bypass duct providing communication between the inlet housing and the outlet housing, the inlet housing and the outlet housing having an inlet opening and an outlet opening respectively;

(b) installing the bypass module in the gully chamber with the inlet opening directed so that inflowing liquid creates a circulating flow within the chamber about a central axis of the chamber, and the outlet opening is directed so that outflowing liquid passes through the outlet opening in a direction opposite of the circulating flow;

(c) forming an opening in the inlet compartment adjacent an inlet duct of the gully chamber whereby liquid flowing from the inlet duct enters the inlet compartment;

(d) forming an opening in the outlet compartment or the bypass duct adjacent an outlet duct of the gully chamber, whereby liquid may flow from the bypass module to the outlet duct.

The bypass duct may be cut to length before the bypass module is assembled so as to position the inlet and outlet housings adjacent the inlet and outlet ducts. This provides flexibility in terms of the orientation of the inlet to and outlet from the separator enabling the separator to readily accommodate a change in direction.

For a better understanding of the present invention, and to show more clearly how it may be carried into effect, reference will now be made, by way of example, to the accompanying drawings, in which:—

FIG. 2 is a section view of a modified separator;

FIG. 3 shows the separator of FIG. 2 viewed from the opposite direction;

Figure 1:
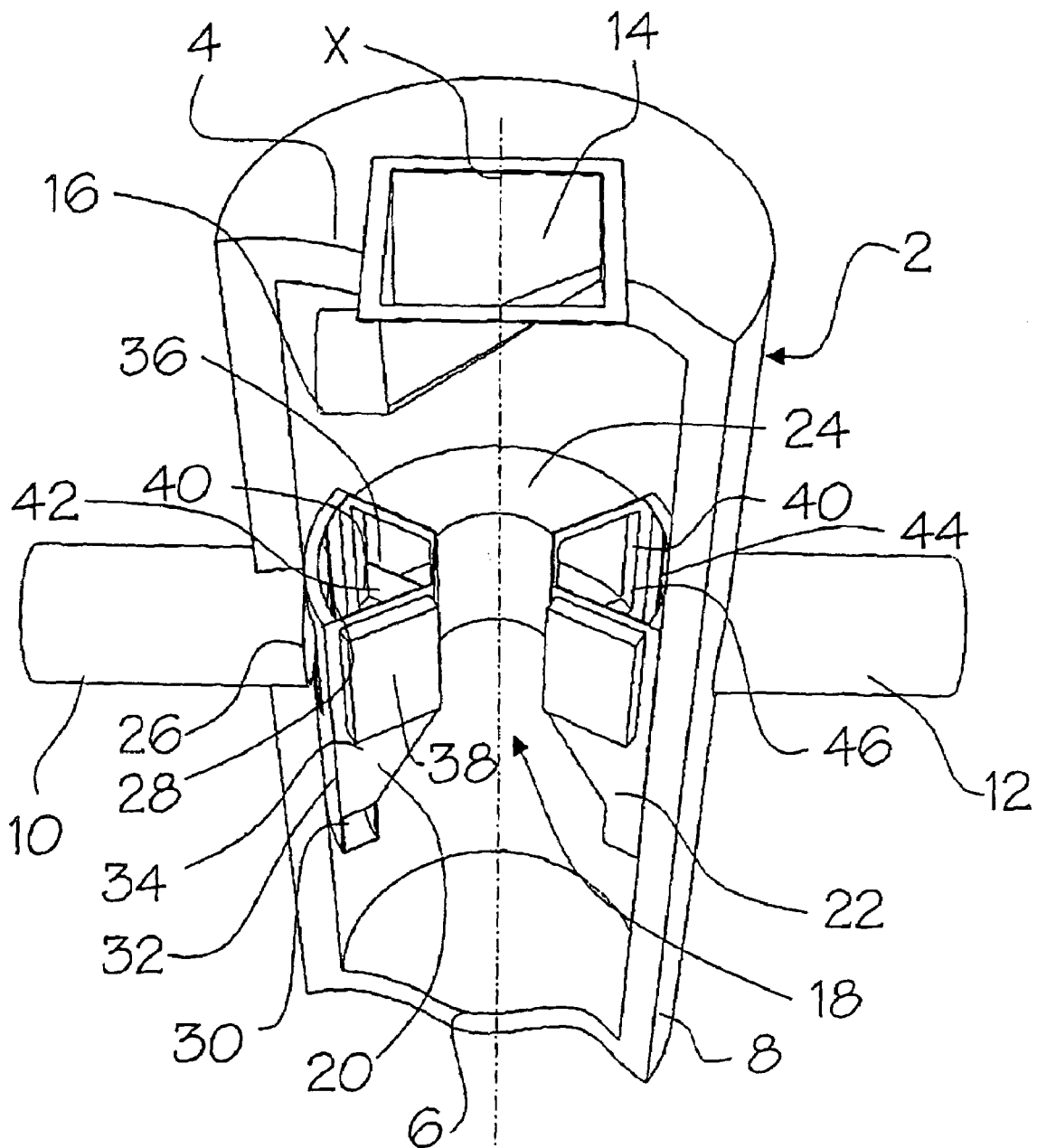
FIG. 1 is a section view of a separator.

The separator shown in FIG. 1 comprises a gully chamber 2 having top and bottom walls 4, 6 and a cylindrical surrounding wall 8. An inlet duct 16 and an outlet duct 12 open into the cylindrical wall 8 on substantially opposite sides of the chamber 2. An inlet chute 14 is fitted to the top wall 4, and may be covered by a grating (not shown) in a roadway passing over the separator. The inlet chute 14 has an outlet 16 opening close to the surrounding wall 8 of the chamber 2.

Within the chamber 2, there is a bypass module 18 which comprises an inlet housing 20, an outlet housing 22 and a bypass duct 24.

The inlet housing 20 lies against the interior surface of the surrounding wall 8 and has an opening 26 which provides communication between the inlet duct 10 and an inlet compartment 28 within the inlet housing 20. An opening 30 is provided at the bottom of the inlet housing 20, this opening 30 serving as an inlet to the interior of the gully chamber 2. The inlet opening 30 is situated close to the internal face of the surrounding wall 8, and is oriented to direct incoming flow tangentially of the chamber 2. That is, it lies in a plane extending radially with respect to the central axis X of the chamber 2.

The inlet housing 20 is generally sector shaped having an arcuate wall 32 lying adjacent the inner face of the surrounding wall 8 of the chamber 2, and two end walls 34, 36 which extend generally radially of the chamber 2. Each end wall 34, 36 has a rectangular projection 38, 40 having a shape complementary to that of the interior of the bypass duct 24. As can be appreciated from FIG. 1, the projection 38 is left intact, but part of the end face of the projection 40 is cut away to provide communication with the bypass duct 24. Only the upper part of the face is removed, leaving a weir 42 between the inlet compartment 28 and the interior of the bypass duct 24. The upper edge of the weir 42 is at a level above that of the lowermost edges of the inlet and outlet ducts 10, 12.

The outlet housing 22 is similar to the inlet housing 20. The inlet and outlet housings 20, 22 are made using moulded housing precursors of plastics material which are identical to each other and which differ only in the way in which openings are formed to communicate with the inlet and outlet ducts respectively and the bypass duct 24. In the case of the outlet housing 22, an opening 44 is formed to provide communication between the outlet compartment 46 and the outlet duct 12 and the entire end wall of the projection 40 is cut away to provide communication between the bypass duct 24 and the outlet compartment 46 over the full cross-section of the bypass duct 24.

Although not shown in FIG. 1, the outlet housing 22 has an opening 47 (see FIG. 3) corresponding to the opening 30 in the inlet housing 20. The opening in the outlet housing 22 is oriented in the same direction as the inlet opening 30 with respect to the circumferential direction around the central axis X of the chamber 2.

A separator as shown in FIG. 1 may be constructed as a complete unit comprising the chamber 2 and the bypass module 18. Alternatively, however, the bypass module 18 can be installed in an existing chamber 2 so as to improve the separation and retention characteristics of that chamber. It will be appreciated that the bypass module 18 comprises only three major components, namely the inlet and outlet housings 20, 22 and the bypass duct 24. The bypass duct may be available in different conduit shapes and sizes (i.e. different radii of curvature), to suit different inlet/outlet orientations and diameters of chamber 2.

To install the bypass module 18, the bypass duct 24 is cut to the appropriate length so as to provide the correct position of the inlet and outlet housings 20, 22. The openings 26 and 44 are cut in the housings 20, 22, and the appropriate openings are formed in the projections 40. The module is then secured to the interior of the chamber 2 by any suitable means. The inlet chute 14 may also be fitted to the top wall 4 of the chamber 2, if no suitable inlet is already provided. Preferably, the outlet 16 of the chute is situated over the open top of the inlet housing 20, so that any storm water flowing through the inlet chute 14 will fall directly into the inlet compartment 28.

In use, under low or moderate flow, incoming water through the inlet duct 10 and the inlet chute 14 will enter the inlet compartment 28, from which it will flow through the inlet opening 30. The flow emerging from the inlet opening 30 will induce a circulating flow in the water accumulated in the lower region of the chamber 2, below the lower edge of the outlet duct 12. This relatively low-energy circulating flow will assist in causing any solids within the incoming flow to accumulate and fall to the bottom of the chamber 2 or rise to the fluid surface depending upon their density. Furthermore, by sweeping past the outlet opening of the outlet housing 22, solids will be less likely to enter the outlet compartment 46. This outlet compartment, and consequently the outlet duct 12, will thus receive substantially clean water.

If the incoming flow rate through the inlet duct 10 increases to a rate above that which can pass through the inlet opening 30, the level in the inlet compartment 28 will rise. Eventually, it will reach the level of the upper edge of the weir 42, and will overflow into the bypass duct 24. Much of the solids material entering the inlet compartment 28 through the inlet duct 10 will pass to the bottom of the inlet housing 20, to emerge from the inlet opening 30, and so, as before, will tend to fall to the bottom of the chamber 2 or rise to the fluid surface. Nevertheless, under heavy flow conditions, some solid material will pass, with the water, over the weir 42 into the bypass duct 24, and thence to the outlet compartment 46 and the outlet duct 12. However, since the main flow within the chamber 2 does not receive the surplus flow passing through the bypass duct 24, there is less likelihood that the high flow throughput will stir up solids from the bottom of the chamber 2 or from the fluid surface and cause them to enter the outlet compartment 46.

FIGS. 2 and 3 show an alternative disposition for the bypass module 18, in which the bypass duct 24 has been cut shorter in order that, with the inlet housing 20 positioned adjacent the inlet duct 10, the outlet housing 22 can be positioned adjacent an outlet duct 12 which is not directly in line with the inlet duct 10. This flexibility is an important feature of the bypass module 18, allowing it to be adapted in a simple manner to different arrangements of inlet and outlet ducts 10, 12.

Figure 4:
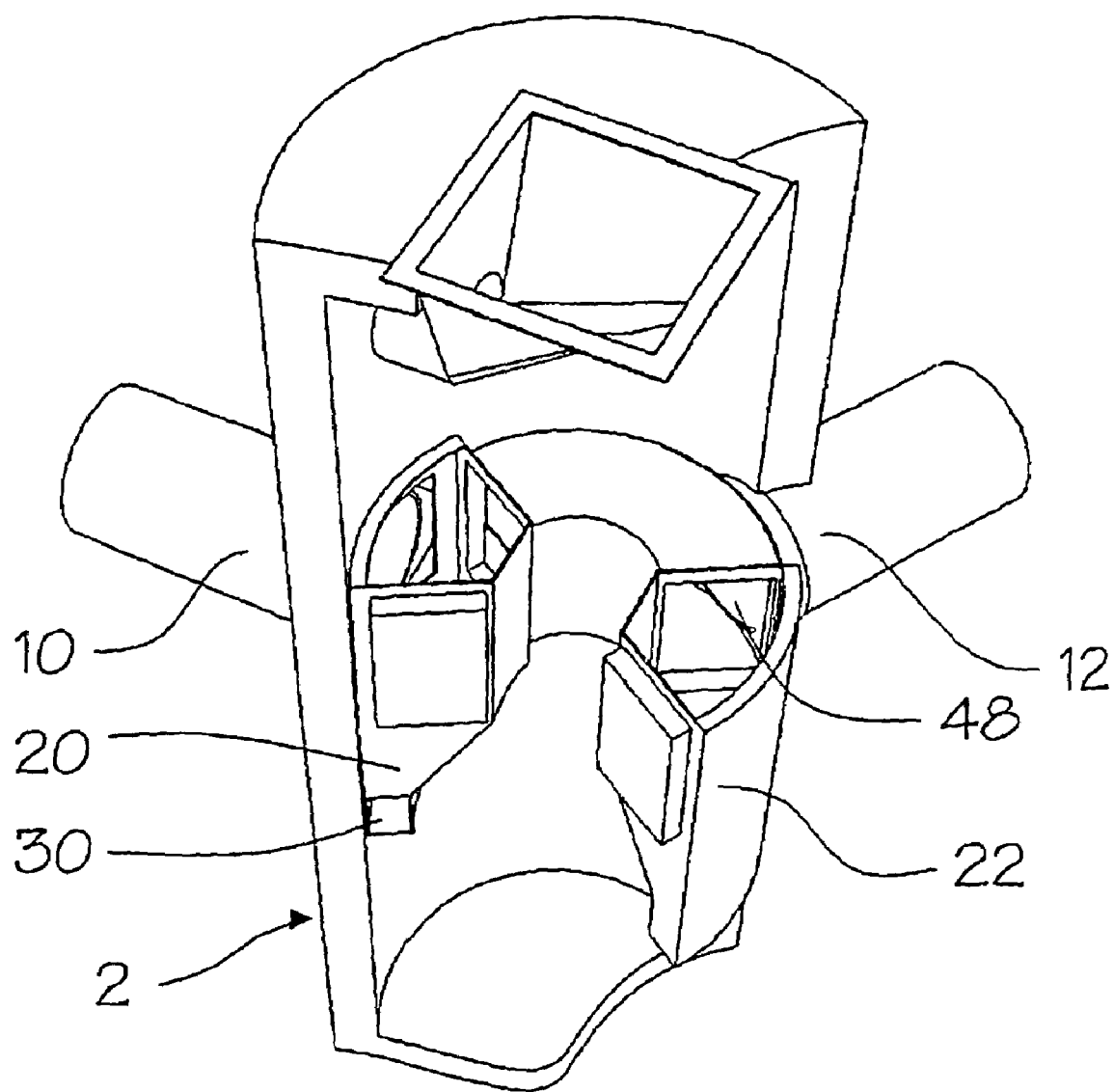
FIG. 4 shows a further modified separator.

FIG. 4 shows an alternative configuration to that of FIGS. 2 and 3, again for use in cases where the inlet and outlet ducts 10, 12 are not in line. In the variant shown in FIG. 4, no opening corresponding to the opening 44 is formed in the arcuate wall of the outlet housing 22. Instead, the corresponding opening 48 is formed in the outer arcuate wall of the bypass duct 24. Thus, outflowing water enters the outlet opening (corresponding to the inlet opening 30) and passes through the outlet compartment 46 into the bypass duct 24 and thence to the outlet duct 12. This variant avoids the need to cut the bypass duct 24 to match the arc between the inlet and outlet ducts 10 and 12.

Figure 5:
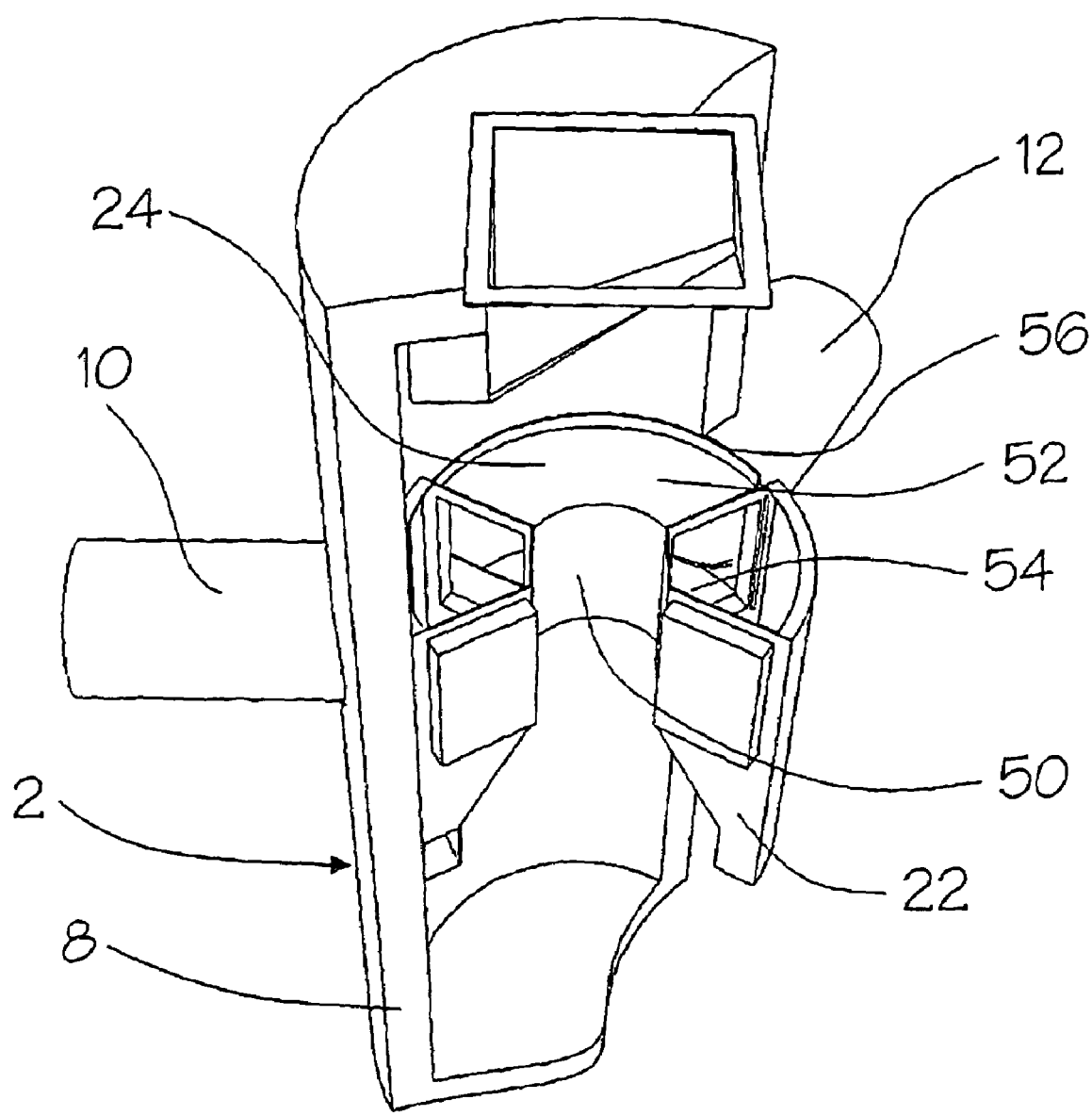
FIG. 5 shows an alternative embodiment of the separator.

The embodiment of FIG. 5 is similar to that of FIG. 4, except that the bypass duct is formed with only three walls, namely an inner wall 50, an upper wall 52 and a lower wall 54. The upper and lower walls are provided with flanges 56 to enable them to be attached to the inner surface of the surrounding wall 8 of the chamber 2. Thus, the interior of the bypass duct 24 is, in fact, defined by the bypass duct 24 itself and the surrounding wall 8 of the chamber 2. This avoids the need to form a separate opening to provide communication between the bypass duct 24 and the outlet duct 12.

Figure 6:
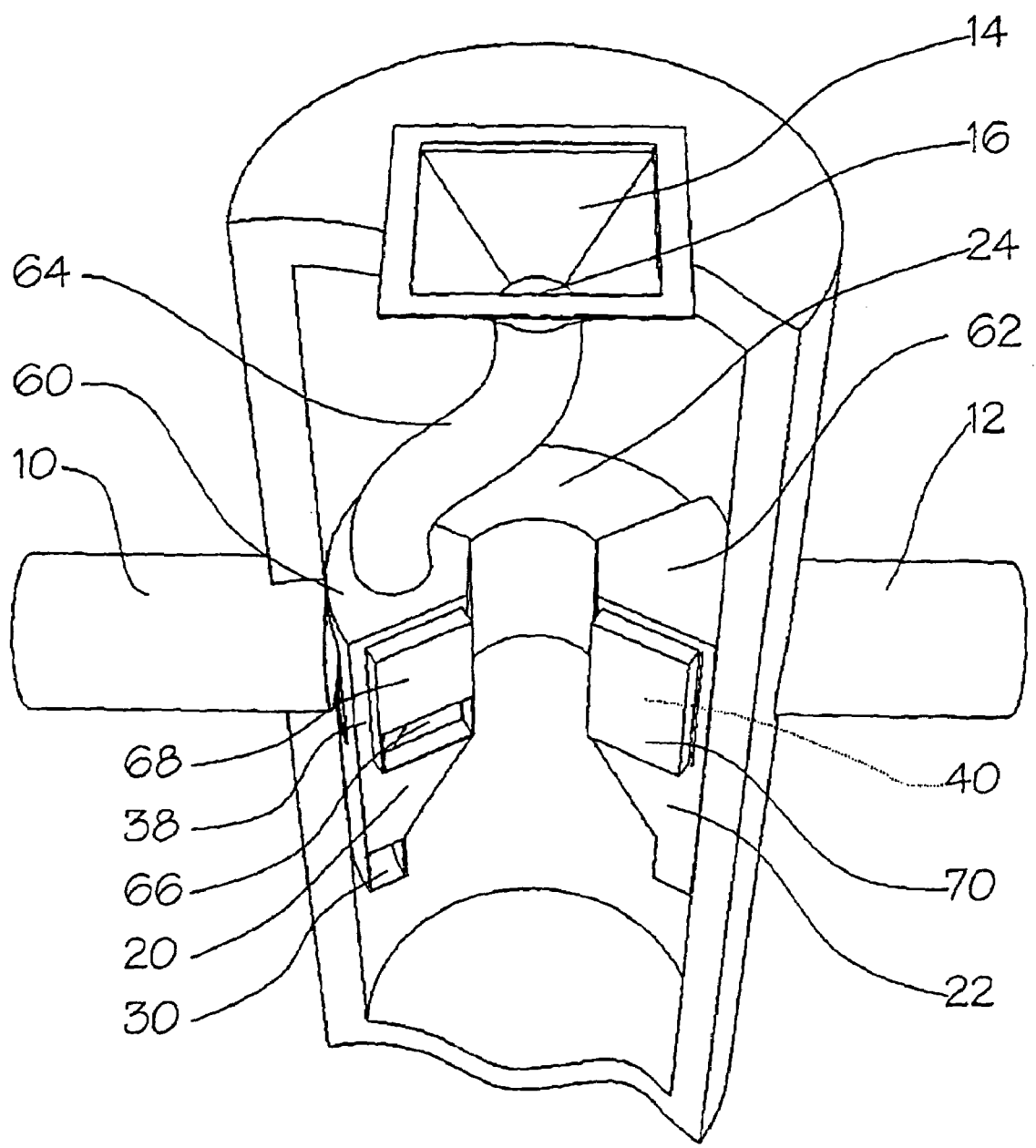
FIG. 6 shows a further alternative embodiment of the separator.

In the embodiment of FIG. 6, several features are shown which may be used individually or together in a separator. Parts corresponding to those shown in the embodiments of FIGS. 1 to 5 are designated by the same reference numbers.

In the separator shown in FIG. 6, the inlet and outlet compartments 28, 46 (FIG. 1) are closed at the top by walls 60,62, which may be fixed or removable. The outlet 16 of the inlet chute 14 projects downwardly and is connected by a flexible pipe 64 to a spigot projecting upwardly from the top wall 60 of the inlet chamber. If the flexible hose is not used, the spigot may be closed by a removable lid.

In the previous embodiments, the rectangular projections 38 and 40 on the inlet and outlet housings 20, 22 not engaged by the bypass duct 24 were moulded integrally with the housings themselves, and left intact. In the embodiment shown in FIG. 6, the projection 38 on the inlet housing 20 is cut away to provide a solids escape aperture 66. In an alternative form, the moulded end face of the projection is cut away or omitted altogether, and a maintenance access cover, with or without the aperture 66, is fitted over the resulting opening. A similar cover 70 may be provided over the projection 40 on the outlet housing 22, after the end face, if moulded with the outlet housing, has been removed.

In use of the separator shown in FIG. 6, water and entrained solid material flowing into the chute 14 passes directly to the inlet housing 20 through the flexible pipe 64. At low flow rates, some floatable materials may accumulate at the surface within the inlet housing 20. At higher flow-rates, water will back up in the inlet housing 20. The function of the escape aperture 66 is to allow any accumulated floatable materials in the inlet housing 20 to flow into the main flow in the chamber 2 before the water level in the inlet housing 20 reaches the upper edge of the weir 42. Thus the accumulated solids are discharged from the inlet housing 20 into the main flow without being discharged over the weir 42 into the bypass duct 24 and thence to the outlet duct 12. In order to serve this purpose, the top edge of the escape aperture is either at or below the top edge of the weir 42.

If flow through the outlet 12 is restricted for any reason, the level within the chamber 2 may rise above the level of the tops of the inlet and outlet housings 20, 22. The top walls 60, 62 prevent the loss of floatable materials in such circumstances, keeping them within the upper region of chamber 2. The same objective could be achieved by increasing the height of the walls of the inlet and outlet housings 20, 22.

The removable covers 68, 70 enable access to the interiors of the inlet and outlet housings 20, 22 for maintenance purposes or to clear blockages.

Another possible measure, not shown in the Figures, is to raise the bypass duct 24 relative to the inlet and outlet housings 20, 22 such that the lower wall of the bypass duct 24 defines the bypass level, thereby eliminating the need for the separate weir 42.

Separators in accordance with the present invention thus provide a relatively low cost device which can separate a large proportion of the solids materials from a flow of liquid. Furthermore, the bypass module 38 can be installed in existing gullies with very little fabrication and assembly work, using moulded plastics components. Because the bypass duct 24 does not extend straight across the middle of the chamber 2, but instead, being of arcuate form, avoids the central axis X, access is left for equipment to remove settled solids materials at the bottom of the chamber 2 and/or floatable materials from the fluid surface.

We claim:

1. A separator for separating solids from a liquid flow, said separator comprising:
   a cylindrical wall defining a chamber having a central axis;
   an inlet housing situated within the chamber, the inlet housing having a housing wall defining an inlet compartment;
   a chamber inlet provided in the housing wall of the inlet housing, the chamber inlet being directed so that liquid flowing from the inlet compartment to the chamber through the chamber inlet creates a circulating flow within the chamber about the central axis;
   an outlet housing situated within the chamber, the outlet housing having a housing wall defining an outlet compartment;
   a chamber outlet provided in the housing wall of the outlet housing, the chamber outlet being directed so that liquid entering the outlet compartment from the chamber passes through the chamber outlet in a direction about the central axis opposite that of the circulating flow; and
   a bypass duct provided within the cylindrical wall of the chamber and extending around the central axis of the chamber, the bypass duct providing communication between the inlet and outlet compartments, bypassing the chamber inlet and the chamber outlet.

2. The separator as claimed in claim 1, wherein the inlet opening is directed so that incoming flow enters the chamber in a tangential direction with respect to the central axis of the chamber.

3. The separator as claimed in claim 2, wherein the outlet opening is directed tangentially in the same direction about the central axis as the inlet opening.

4. The separator as claimed in claim 1, wherein an inlet duct extends through the chamber wall and emerges into the inlet compartment.

5. The separator as claimed in claim 1, wherein the inlet housing is open at its upper end.

6. The separator as claimed in claim 1, wherein the inlet housing is closed at its upper end by a top wall.

7. The separator as claimed in claim 6, wherein an inlet pipe opens into the inlet compartment at the top wall.

8. The separator as claimed in claim 6, wherein the top wall is removable.

9. The separator as claimed in claim 1, wherein the outlet housing is open at its upper end.

10. The separator as claimed in claim 1, wherein the outlet housing is closed at its upper end by a top wall.

11. The separator as claimed in claim 10, wherein the top wall is removable.

12. The separator as claimed in claim 1, wherein the bypass duct extends adjacent the chamber wall.

13. The separator as claimed in claim 1, wherein the bypass duct is arcuate and has a rectangular cross-section.

14. The separator as claimed in claim 1, wherein the bypass duct communicates with the inlet compartment through an opening in the housing wall of the in let compartment.

15. The separator as claimed in claim 1, wherein a weir is provided between the inlet compartment and the bypass duct.

16. The separator as claimed in claim 15, wherein the inlet compartment communicates with the interior of the chamber through an aperture in the wall of the inlet housing, the aperture having a top edge which is not higher than the top edge of the weir.

17. The separator as claimed in claim 1, wherein an inlet duct opens into the inlet housing, the bypass duct having a lowermost level which is above the lowermost level of the inlet duct.

18. The separator as claimed in claim 17, wherein the inlet compartment communicates with the interior of the chamber through an aperture in the wall of the inlet housing, the aperture having a top edge which is not higher than the lowermost level of the bypass duct.

19. A separator for separating solids from a liquid flow, said separator comprising:

a cylindrical wall defining a chamber having a central axis;

an inlet housing situated within the chamber, the inlet housing having a housing wall defining an inlet compartment;

a chamber inlet provided in the housing wall of the inlet housing, the chamber inlet being directed so that liquid flowing from the inlet compartment to the chamber through the chamber inlet creates a circulating flow within the chamber about the central axis;

an outlet housing situated within the chamber, the outlet housing having a housing wall defining an outlet compartment;

a chamber outlet provided in the housing wall of the outlet housing, the chamber outlet being directed so that liquid entering the outlet compartment from the chamber passes through the chamber outlet in a direction about the central axis opposite that of the circulating flow; and a bypass duct provided within the cylindrical wall of the chamber and extending around the central axis of the chamber, the bypass duct providing communication between the inlet and outlet compartments, bypassing the chamber inlet and the chamber outlet, wherein the inlet and outlet housings comprising housing mouldings in which the chamber inlet and the chamber outlet are formed after moulding.

20. The separator as claimed in claim 19, wherein the housing mouldings for the inlet and outlet housings are identical before the openings are made.

21. The separator as claimed in claim 19, wherein the mouldings have projections for fitting within the bypass duct so as to locate the components relatively to each other.

22. The separator as claimed in claim 19, wherein at least one of the inlet and outlet housings has a closable maintenance opening.

23. A method of modifying a gully chamber to provide a separator, the method comprising:

a. assembling a bypass module from an inlet housing defining an inlet compartment, an outlet housing defining an outlet compartment, and a bypass duct providing communication between the inlet compartment and the outlet compartment, the inlet housing and the outlet housing having an inlet opening and an outlet opening respectively;

b. installing the bypass module in the gully chamber with the inlet opening directed so that liquid flowing into the gully chamber through the inlet opening creates a circulating flow within the chamber about a central axis of the chamber, and the outlet opening is directed so that liquid flowing from the gully chamber through the outlet opening passes through the outlet opening in a direction about the central axis opposite that of the circulating flow;

c. forming an opening in the inlet housing adjacent an inlet duct of the gully chamber whereby liquid flowing from the inlet duct enters the inlet compartment; and d. forming an opening in the outlet housing or the bypass duct adjacent an outlet duct of the gully chamber, whereby liquid may flow from the bypass module to the outlet duct.

24. The method as claimed in claim 23, wherein the bypass duct is cut to length before the bypass module is assembled so as to position the inlet and outlet housings adjacent the inlet and outlet ducts.

* * * * *